US012811822B2

(12) United States Patent
Wei

(10) Patent No.: US 12,811,822 B2
(45) Date of Patent: Nov. 24, 2026

(54) MONITORING DEVICE, ELECTRONIC DEVICE CONTROL SYSTEM AND METHOD

(71) Applicant: Chicony Electronics Co., Ltd., New Taipei City (TW)

(72) Inventor: Chia-Liang Wei, New Taipei City (TW)

(73) Assignee: Chicony Electronics Co., Ltd., New Taipei City (TW)

( * ) Notice: Subject to any disclaimer, the term of this patent is extended or adjusted under 35 U.S.C. 154(b) by 369 days.

(21) Appl. No.: 18/356,207

(22) Filed: Jul. 20, 2023

(65) Prior Publication Data

US 2024/0250842 A1 Jul. 25, 2024

(30) Foreign Application Priority Data

Jan. 19, 2023 (TW) ................................ 112102825

(51) Int. Cl.
*H04L 12/28* (2006.01)

(52) U.S. Cl.
CPC .. *H04L 12/2816* (2013.01); *H04L 2012/2841* (2013.01)

(58) Field of Classification Search
CPC .................... H04L 12/2816; H04L 2012/2841
See application file for complete search history.

(56) References Cited

U.S. PATENT DOCUMENTS

2013/0330084 A1* 12/2013 Du ........................ G08C 23/04 398/106
2015/0222862 A1* 8/2015 Lee ...................... G08C 17/02 348/143

FOREIGN PATENT DOCUMENTS

CN 106530657 A 3/2017

* cited by examiner

*Primary Examiner* — Charles R Kasenge
(74) *Attorney, Agent, or Firm* — CKC & Partners Co., LLC

(57) ABSTRACT

The present disclosure provides monitoring device, electronic device control system and method. The electronic device control system includes the monitoring device and at least one electronic device. The monitoring device includes lens component, light emitting component, communication circuit and control circuit. The lens component is configured to capture image. The communication circuit is configured to establish wireless connection with mobile device, and is configured to receive first control data from the mobile device via the wireless connection. The control circuit is electrically coupled to the lens component, the light emitting component and the communication circuit, and is configured to control the light emitting component to emit first optical control signal to the at least one electronic device according to the first control data, so that the at least one electronic device performs first action according to the first optical control signal.

18 Claims, 6 Drawing Sheets

300

MONITORING DEVICE, ELECTRONIC DEVICE CONTROL SYSTEM AND METHOD

CROSS-REFERENCE TO RELATED APPLICATION

This application claims priority to Taiwan application Serial Number 112102825, filed Jan. 19, 2023, which is herein incorporated by reference in its entirety.

BACKGROUND

Field of Invention

This disclosure relates to a system and method, and in particular to an electronic device control system and method, which include a monitoring device.

Description of Related Art

Most of the existing smart houses require one master control device capable of connecting to the network and one or more smart household appliances or equipment capable of connecting to the master control device. On such basis, users can use their mobile devices to realize remote control. To realize smart house, the users must purchase additional smart household appliances to replace the conventional household appliances existing at home. The smart household appliances (usually with built-in wireless communication module, such as Wi-Fi, Bluetooth, ZigBee, etc.) are more expensive than the conventional household appliances (usually using optical communication technology, such as infrared, etc.), which is not what the users want. In addition, the smart household appliances of different brands may not share one master control device, such that the users are forced to purchase the smart household appliances of the same brand, which is extremely inconvenient for the users. Therefore, it is necessary to improve these.

SUMMARY

An aspect of present disclosure relates to a monitoring device. The monitoring device includes a lens component, a light emitting component, a communication circuit and a control circuit. The lens component is configured to capture an image. The communication circuit is configured to establish a wireless connection with a mobile device, and is configured to receive a first control data from the mobile device via the wireless connection. The control circuit is electrically coupled to the lens component, the light emitting component and the communication circuit, and is configured to control the light emitting component to emit a first optical control signal to at least one electronic device according to the first control data, so that the at least one electronic device performs a first action according to the first optical control signal.

Another aspect of present disclosure relates to an electronic device control system. The electronic device control system includes a monitoring device and at least one electronic device. The monitoring device includes a lens component, a light emitting component, a communication circuit and a control circuit. The lens component is configured to capture an image. The communication circuit is configured to establish a wireless connection with a mobile device, and is configured to receive a first control data from the mobile device via the wireless connection. The control circuit is electrically coupled to the lens component, the light emitting component and the communication circuit, and is configured to control the light emitting component to emit a first optical control signal according to the first control data. The at least one electronic device is configured to perform a first action according to the first optical control signal.

Another aspect of present disclosure relates to an electronic device control method. The electronic device control method includes: establishing a wireless connection between a monitoring device and a mobile device; by the monitoring device, receiving a control data from the mobile device via the wireless connection; by the monitoring device, emitting an optical control signal to an electronic device according to the control data; and by the electronic device, performing an action according to the optical control signal.

Another aspect of present disclosure relates to an electronic device control method. The electronic device control method includes: by a monitoring device, receiving a control audio input; by the monitoring device, processing the control audio input to obtain a control data; by the monitoring device, emitting an optical control signal to an electronic device according to the control data; and by the electronic device, performing an action according to the optical control signal.

DETAILED DESCRIPTION

The embodiments are described in detail below with reference to the appended drawings to better understand the aspects of the present disclosure. However, the provided embodiments are not intended to limit the scope of the disclosure, and the description of the structural operation is not intended to limit the order in which they are performed. Any device that has been recombined by components and produces an equivalent function is within the scope covered by the disclosure.

The terms used in the entire specification and the scope of the patent application, unless otherwise specified, generally have the ordinary meaning of each term used in the field, the content disclosed herein, and the particular content.

The terms "coupled" or "connected" as used herein may mean that two or more elements are directly in physical or electrical contact, or are indirectly in physical or electrical contact with each other. It can also mean that two or more elements interact with each other.

Figure 1:
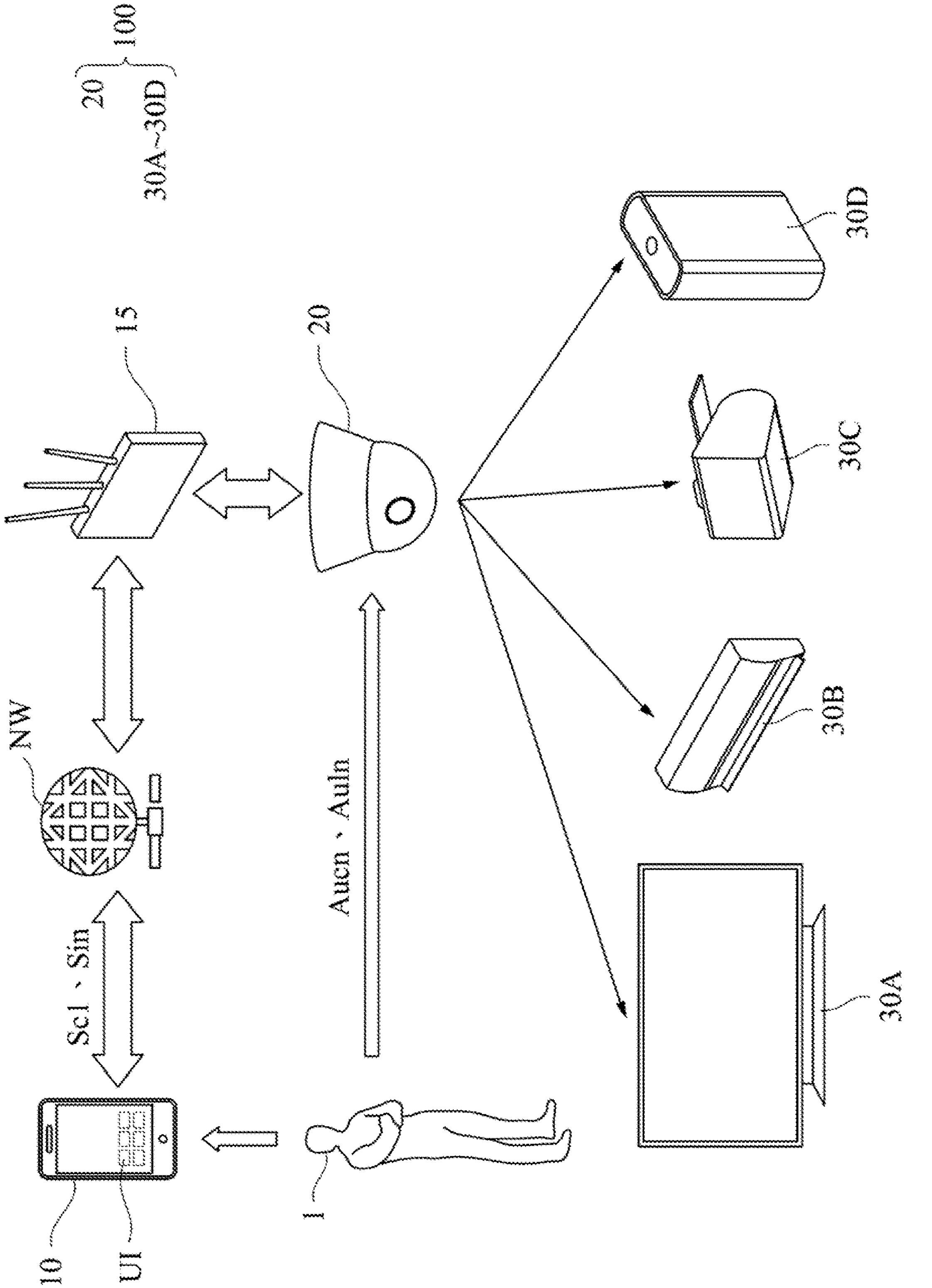
FIG. 1 is a schematic diagram of an electronic device control system in accordance with some embodiments of the present disclosure.

Referring to FIG. 1, FIG. 1 is a schematic diagram of an electronic device control system 100 in accordance with some embodiments of the present disclosure. In some embodiments, the electronic device control system 100 includes a monitoring device 20 and a plurality of electronic devices 30A-30D.

In some embodiments, the monitoring device 20 and the electronic devices 30A-30D are all arranged at home, residence or work environment of a user 1. For example, as shown in FIG. 1, the monitoring device 20 can be an IP camera, the electronic devices 30A-30D each can be television, air conditioner, rolling door, air purifier or other conventional household appliances or equipment being remote-controlled through optical communication technology, but the present disclosure is not limited herein. Notably, the user 1 can remotely control the electronic devices 30A-30D through the monitoring device 20. In other words, the electronic device control system 100 can help the user 1 realize smart house.

The descriptions would be further illustrated with reference to FIG. 1 according to the above embodiments. In the condition that the user 1 is not at home, the user 1 can connect a mobile device 10 to a network NW provided by an internet provider (not shown). Moreover, the monitoring device 20 arranged at the home of the user 1 can be connected to the network NW by a router 15. In other words, the mobile device 10 and the monitoring device 20 can communicate with each other via the network NW. By operating a user interface UI on the mobile device 10, the user 1 not at home can still remotely control the electronic devices 30A-30D arranged at the home of the user 1 through the monitoring device 20. The user interface UI can be provided by the application installed on the mobile device 10, but the present disclosure is not limited herein.

As can be understood that, even if the user 1 is at home, the user 1 can also operate the mobile device 10 to remotely control the electronic devices 30A-30D through the monitoring device 20. However, the present disclosure is not limited herein. In the condition that the user 1 is at home, the user 1 can further control the monitoring device 20 directly in a voice-controlled manner to remotely control the electronic devices 30A-30D, which would be described in detail in the following paragraphs.

In the embodiments of FIG. 1, the mobile device 10 is a smartphone, but the present disclosure is not limited herein. For example, the mobile device 10 can be implemented by a device that the user 1 can carry with, such as tablet, laptop, personal digital assistant (PDA), etc. It can be understood that the mobile device 10 can connect to the network NW through wireless local area network technology (e.g., Wi-Fi, etc.) or mobile communication technology (e.g., 4G, 5G, etc.) to communicate with the monitoring device 20. In addition, the monitoring device 20 is not limited to communicating with the mobile device 10 via the network NW. For example, the communication between the monitoring device 20 and the mobile device 10 can be implemented by Bluetooth low energy (BLE), ZigBee or other wireless communication technologies.

For the convenience of descriptions, the electronic device control system 100 in FIG. 1 shows four electronic devices 30A-30D, but the present disclosure is not limited herein. For example, in other embodiments, the electronic device control system 100 can include the monitoring device 20 and one of the four electronic devices 30A-30D only. In other words, the electronic device control system 100 of the present disclosure can include the monitoring device 20 and at least one electronic device 30.

Figure 2:
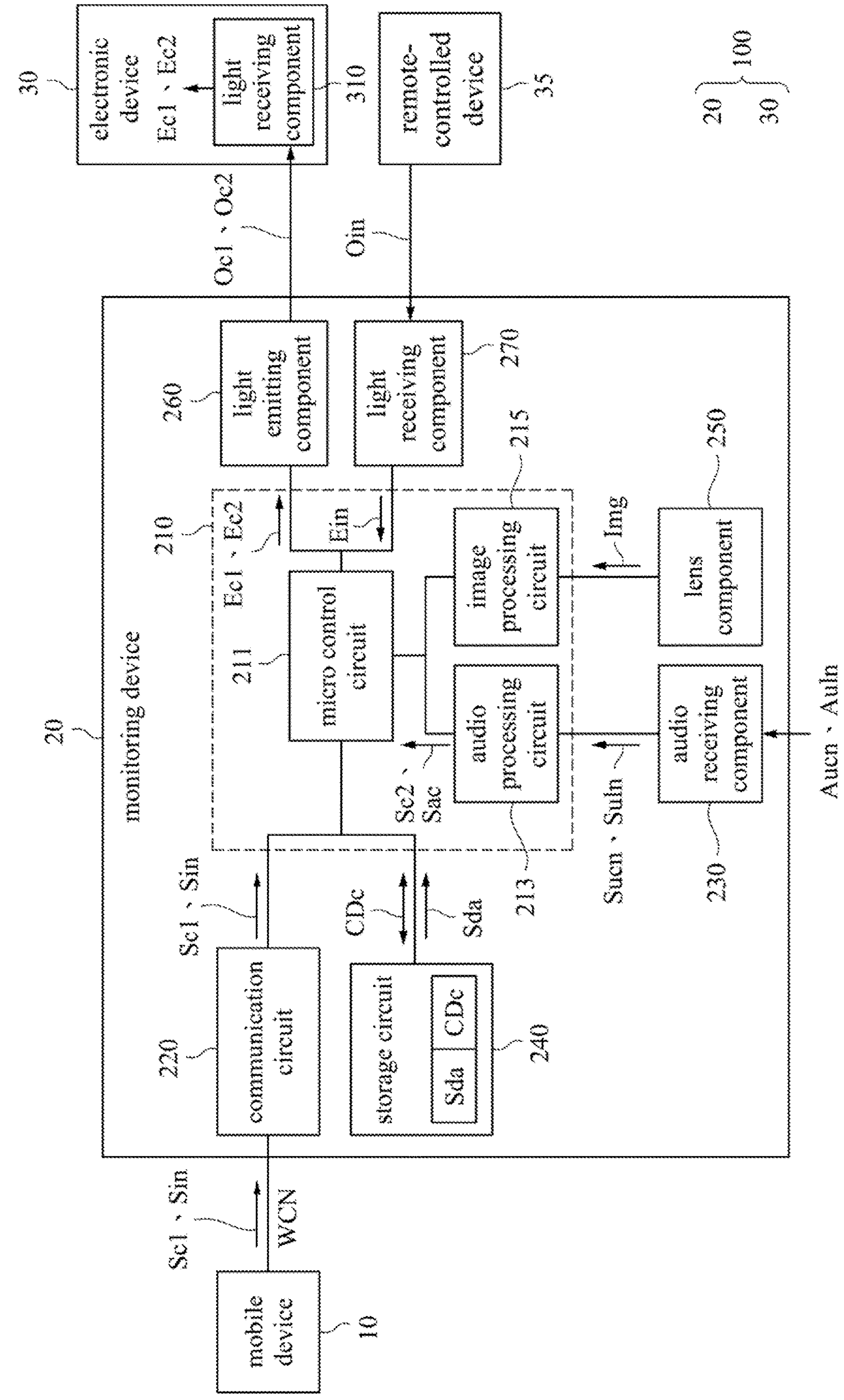
FIG. 2 is a block diagram of an electronic device control system in accordance with some embodiments of the present disclosure.

The internal structure of the monitoring device 20 of the present disclosure would be described in detail below with reference to FIG. 2. Referring to FIG. 2, FIG. 2 is a block diagram of the electronic device control system 100 in accordance with some embodiments of the present disclosure. In some embodiments, the monitoring device 20 includes a control circuit 210, a communication circuit 220, an audio receiving component 230, a storage circuit 240, a lens component 250, a light emitting component 260 and a light receiving component 270. As shown in FIG. 2, the control circuit 210 is electrically coupled to the communication circuit 220, the audio receiving component 230, the storage circuit 240, the lens component 250, the light emitting component 260 and the light receiving component 270.

In some embodiments, the communication circuit 220 is configured to communicate with the mobile device 10. In particular, the communication circuit 220 can be implemented by Ethernet port and/or wireless local area network circuit (e.g., Wi-Fi, etc.), and can be connected to the router 15 wirelessly or wiredly, so as to communicate with the mobile device 10 via the network NW. The communication circuit 220 can also be implemented by mobile communication circuit (e.g., 4G, 5G, etc.), and can connect to the network NW wirelessly, so as to communicate with the mobile device 10 via the network NW. However, the present disclosure is not limited herein. In some embodiments, the communication circuit 220 can be implemented by Bluetooth low energy (BLE), ZigBee or other wireless communication technologies, and can be directly coupled to the mobile device 10 in a wireless and non-network manner, so as to wirelessly communicate with the mobile device 10.

In some embodiments, the audio receiving component 230 is configured to receive and convert sounds in the surrounding environment into electric signals, and can be implemented by one or more microphones.

In some embodiments, the storage circuit 240 is configured to store signals, data and/or information required by the operation of the monitoring device 20, and can be implemented by one or more memories.

In some embodiments, the lens component 250 is configured to capture images Img of the surrounding environment, and can be implemented by a structure including one or more lenses and a light sensitive component (e.g., complementary metal oxide semiconductor (CMOS) image sensor, charge coupled device (CCD) image sensor, etc.).

In some embodiments, the light emitting component 260 is configured to emit invisible light beams, and can be implemented by laser diode or light emitting diode (LED). In particular, the invisible light beams emitted by the light emitting component 260 can be infrared light beams, but the present disclosure is not limited herein.

In some embodiments, the light receiving component 270 is configured to receive and convert invisible light beams into electric signals, and can be implemented by photoelectric diode, phototransistor or optical gate. In particular, the invisible light beams received by the light receiving component 270 can be infrared light beams, but the present disclosure is not limited herein.

In some embodiments, the control circuit 210 is configured to process signals, data and/or information required by the operation of the monitoring device 20, and is configured to control the communication circuit 220, the storage circuit 240, the audio receiving component 230, the lens component 250, the light emitting component 260 and the light receiving component 270. In particular, the control circuit 210 can be implemented by one or more central processing unit (CPU), application-specific integrated circuit (ASIC), microprocessor, system on a Chip (SoC) or other processing units.

In some embodiments, the control circuit 210 includes a micro control circuit 211, an audio processing circuit 213 and an image processing circuit 215. As shown in FIG. 2, the micro control circuit 211 is coupled to the communication circuit 220, the storage circuit 240, the audio processing circuit 213, the image processing circuit 215, the light emitting component 260 and the light receiving component 270 for controlling and transmitting signals, data and/or information. The audio processing circuit 213 is coupled between the micro control circuit 211 and the audio receiving component 230, and is configured to process the electric signals outputted by the audio receiving component 230. In addition, the image processing circuit 215 is coupled between the micro control circuit 211 and the lens component 250, and is configured to process the images Img captured by the lens component 250.

In some embodiments, the electronic device 30 includes a light receiving component 310. The light receiving component 310 is configured to receive and convert invisible light beams into electric signals, and can be implemented by photoelectric diode, phototransistor or optical gate, but the present disclosure is not limited herein. In addition, the electronic device 30 is usually paired with a remote-controlled device 35. The remote-controlled device 35 is configured to emit invisible light beams to the light receiving component 310 of the electronic device 30, so as to control the electronic device 30. For example, the electronic device 30 is a television, and the remote-controlled device 35 is a television remote controller. In particular, the invisible light beams received by the light receiving component 310 and the invisible light beams emitted by the remote-controlled device 35 all can be infrared light beams.

Figure 3:
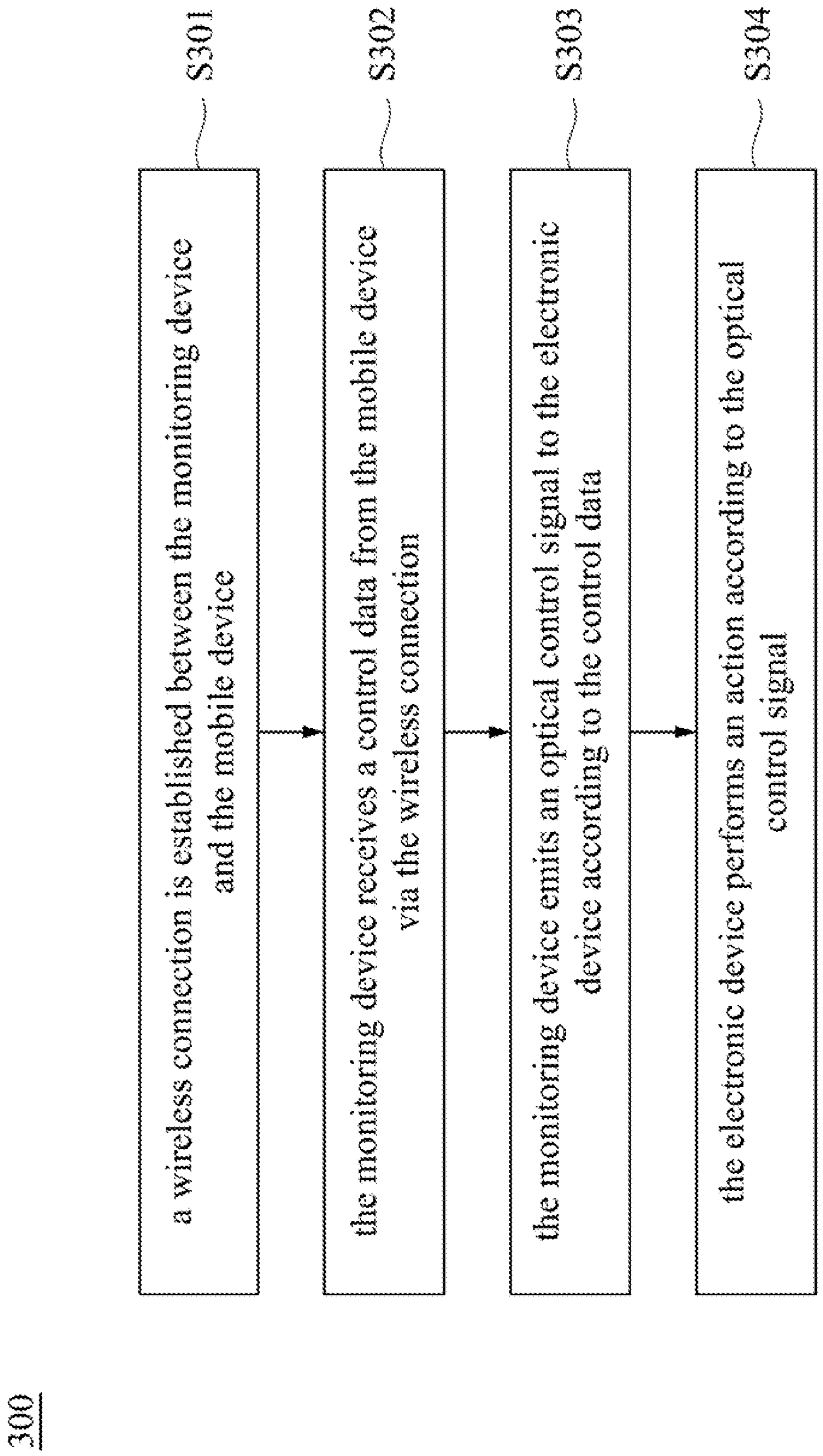
FIG. 3 is a flow diagram of an electronic device control method in accordance with some embodiments of the present disclosure.

For clearly describing the operation of every component in FIGS. 1 and 2 and the electronic device control method of the present disclosure, one operation of the electronic device control system 100 would be described in detail below with reference to FIG. 3. Referring to FIG. 3, FIG. 3 is a flow diagram of an electronic device control method 300 in accordance with some embodiments of the present disclosure. However, the person skilled in the art of the present disclosure should understand that the electronic device control method 300 of the embodiments of the present disclosure is not limited to being applied to the electronic device control system 100 of FIGS. 1 and 2, and is not limited to being in the order of steps in the flow diagram of FIG. 3. In some embodiments, the electronic device control method 300 includes steps S301-S304.

In step S301, as shown in FIG. 2, a wireless connection WCN is established between the monitoring device 20 and the mobile device 10. In some embodiments, as shown in FIG. 1, the monitoring device 20 connects to the network NW by the communication circuit 220 (and the router 15), so as to establish the wireless connection WCN with the mobile device 10 which also connects to the network NW. In addition, as the descriptions of FIG. 2, the monitoring device 20 can also be directly coupled to the mobile device 10 by only the communication circuit 220, so as to establish the wireless connection WCN with the mobile device 10.

In step S302, the monitoring device 20 receives a control data Sc1 from the mobile device 10 via the wireless connection WCN. In some embodiments, as shown in FIG. 1, the control data Sc1 is generated based on data (or information) inputted by the user 1 through the user interface UI on the mobile device 10. For example, the user 1 selects "air purifier" from the device menu on the user interface UI, and then selects "turn off" from the action menu on the user interface UI. After the user 1 finishes inputting, the mobile device 10 would generate the control data Sc1 including the device code "air purifier" and the execution action "turn off". Then, as shown in FIG. 2, the control data Sc1 is transmitted from the mobile device 10 to the communication circuit 220 via the wireless connection WCN, and is then transmitted from the communication circuit 220 to the micro control circuit 211 in the control circuit 210.

In step S303, the monitoring device 20 emits an optical control signal Oc1 to the electronic device 30 according to the control data Sc1.

In some embodiments, as shown in FIG. 2, multiple device action data Sda and multiple control codes CDc corresponding to the multiple device action data Sda are pre-stored in the storage circuit 240. For example, the device action data Sda can include the device code "air conditioner" and the execution action "turn on", and the corresponding control code CDc can control the electronic device 30 corresponding to the device code "air conditioner" to be turned on at the set time.

In accordance with the above embodiments, the control circuit 210 can use the micro control circuit 211 to compare the control data Sc1 with the multiple device action data Sda in the storage circuit 240, and then to find one of the multiple device action data Sda matched to the control data Sc1. In the above example, the control data Sc1 includes the device code "air purifier" and the execution action "turn off", and therefore the micro control circuit 211 finds the device action data Sda also including the device code "air purifier" and the execution action "turn off". As shown in FIG. 2, the micro control circuit 211 transmits an electric control signal Ec1 having the control code CDc to the light emitting component 260 according to the control code CDc corresponding to the device action data Sda matched to the control data Sc1. For example, the control code CDc can be a binary code of "01101", and the electric control signal Ec1 has the voltage level corresponding to the binary code according to the timing. Then, the light emitting component 260 emits the optical control signal Oc1 to the electronic device 30 corresponding to the device code "air purifier" according the voltage level of the electric control signal Ec1 transmitted based on the control data Sc1. As can be seen from that, the light emitting component 260 can be regarded as emitting the optical control signal Oc1 according to the control code CDc matched to the control data Sc1. In addition, the light emitting component 260 uses the Infrared Data Association (IrDa) protocol to emit the optical control signal Oc1.

In step S304, the electronic device 30 performs an action according to the optical control signal Oc1. In some embodiments, as shown in FIG. 2, the light receiving component 310 in the electronic device 30 receives the optical control signal Oc1, and converts the optical control signal Oc1 into the electric control signal Ec1 having the control code CDc, so that the electronic device 30 performs the corresponding action. In accordance with the above example, the electronic device 30 corresponding to the device code "air purifier" can convert the electric control signal Ec1 into the control code CDc by the internal processing circuit (not shown), so as to be turned off according to the control code CDc.

Figure 4:
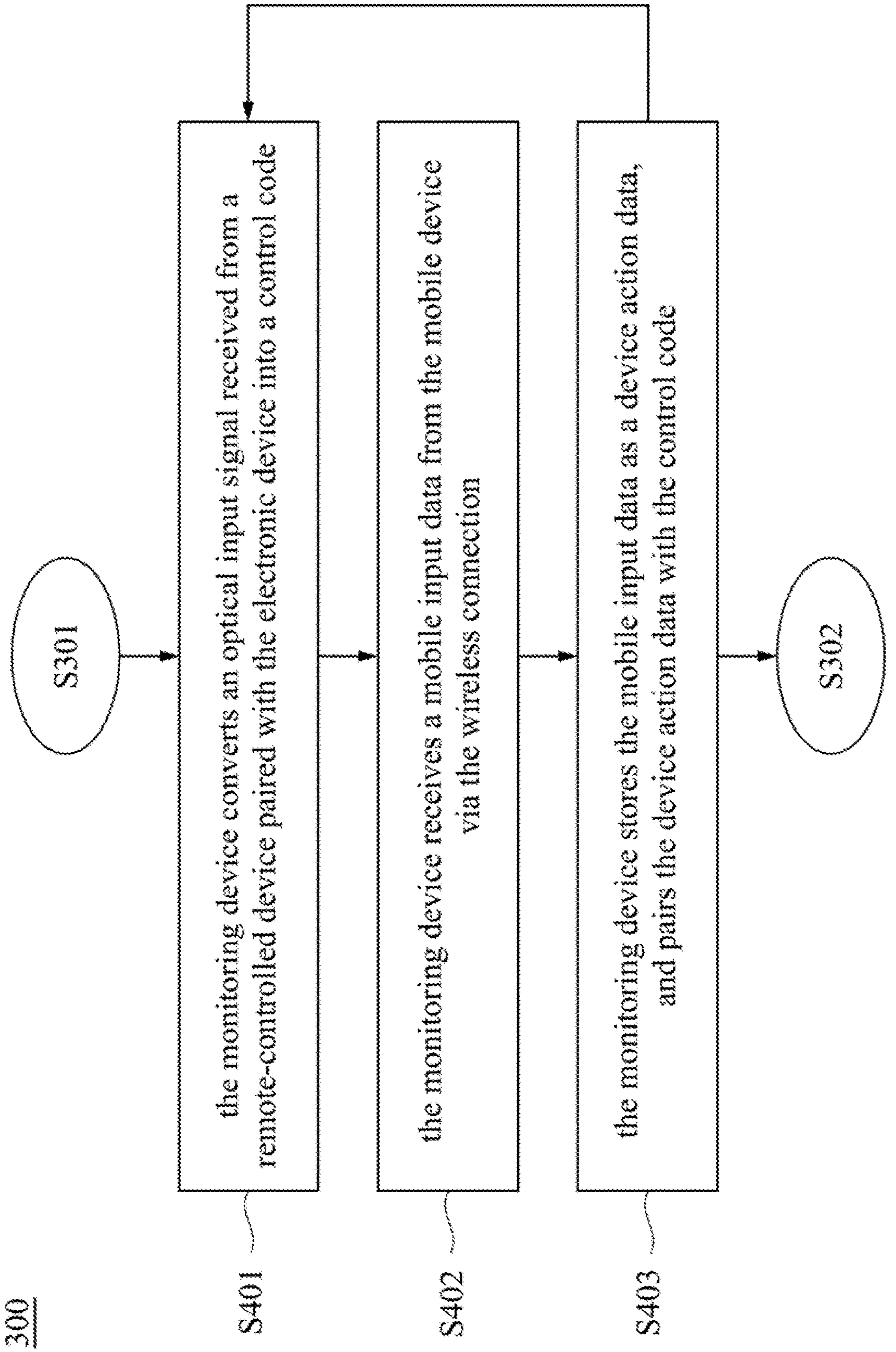
FIG. 4 is a flow diagram of an electronic device control method in accordance with some embodiments of the present disclosure.

The embodiments of FIG. 3 are illustrated based on that the storage circuit 240 has already stored the multiple device action data Sda and the multiple control codes CDc, but the electronic device control method 300 of the present disclosure is not limited herein. For example, referring to FIG. 4, FIG. 4 is a flow diagram of the electronic device control method 300 in accordance with some embodiments of the present disclosure. In some embodiments, the storage circuit 240 has not stored the multiple device action data Sda and the multiple control codes CDc yet. Accordingly, the electronic device control method 300 further includes steps S401-S403. As shown in FIG. 4, steps S401-S403 can be performed between step S301 and step S302. Steps S401-S403 are not limited to being in the order of steps in flow diagram of FIG. 4, for example, step S402 can be performed before step S401.

In step S401, the monitoring device 20 converts an optical input signal Oin received from the remote-controlled device 35 paired with the electronic device 30 into the control code CDc. In particular, as shown in FIG. 2, the light receiving component 270 converts the optical input signal Oin into an electric input signal Ein after receiving the optical input signal Oin. The control circuit 210 then decodes the electric input signal Ein to obtain the corresponding control code CDc. An example that the electronic device 30 is air conditioner and that the remote-controlled device 35 is remote controller of the air conditioner is took herein. The optical input signal Oin is emitted by the remote-controlled device 35 in response to the key "sleep mode" being pressed. It can be understood that if the electronic device 30 receives the optical input signal Oin emitted by the remote-controlled device 35 through the light receiving component 310, the light receiving component 310 would also convert the optical input signal Oin into the electric input signal Ein. Then, the internal processing circuit of the electronic device 30 receives and converts the electric input signal Ein to obtain the corresponding control code CDc, so that the electronic device 30 is controlled to operate in sleep mode. As can be seen from that, the monitoring device 20 of the present disclosure receives and converts the optical input signal Oin that the remote-controlled device 35 is set to emit to the electronic device 30 after manufacture into the control code CDc, and the control code CDc is configured to control the electronic device 30.

In step S402, the monitoring device 20 receives a mobile input data Sin from the mobile device 10 via the wireless connection WCN. In some embodiments, the mobile input data Sin is generated based on data (or information) inputted by the user 1 through the user interface UI on the mobile device 10. For example, the user 1 adds "air conditioner" to the device menu on the user interface UI, and then adds "sleep mode" to the action menu on the user interface UI. After the user 1 finishes inputting, the mobile device 10 generates the mobile input data Sin including the device code "air conditioner" and the execution action "sleep mode". Then, as shown in FIG. 2, the mobile input data Sin is transmitted from the mobile device 10 to the communication circuit 220 via the wireless connection WCN, and is transmitted from the communication circuit 220 to the control circuit 210.

In step S403, the monitoring device 20 stores the mobile input data Sin as one device action data Sda, and pairs the device action data Sda with the control code CDc obtained by converting the optical input signal Oin in step S401. In some embodiments, the control circuit 210 uses the mobile input data Sin received from the communication circuit 220 as the device action data Sda, and stores the device action data Sda and the control code CDc obtained by converting the electric input signal Ein received from the light receiving component 270 in the storage circuit 240 for pairing.

By repeatedly performing steps S401-S403, the monitoring device 20 can learn or memorize the multiple control codes CDc used for controlling a variety of electronic devices 30 to perform multiple different actions. In addition, as can be seen from the description of FIG. 3, by comparing the control data Sc1 with the multiple device action data Sda, the monitoring device 20 can find the control code CDc corresponding to the control data Sc1 rapidly, so as to control specific electronic device 30 to perform specific action chosen by the user 1.

Figure 5:
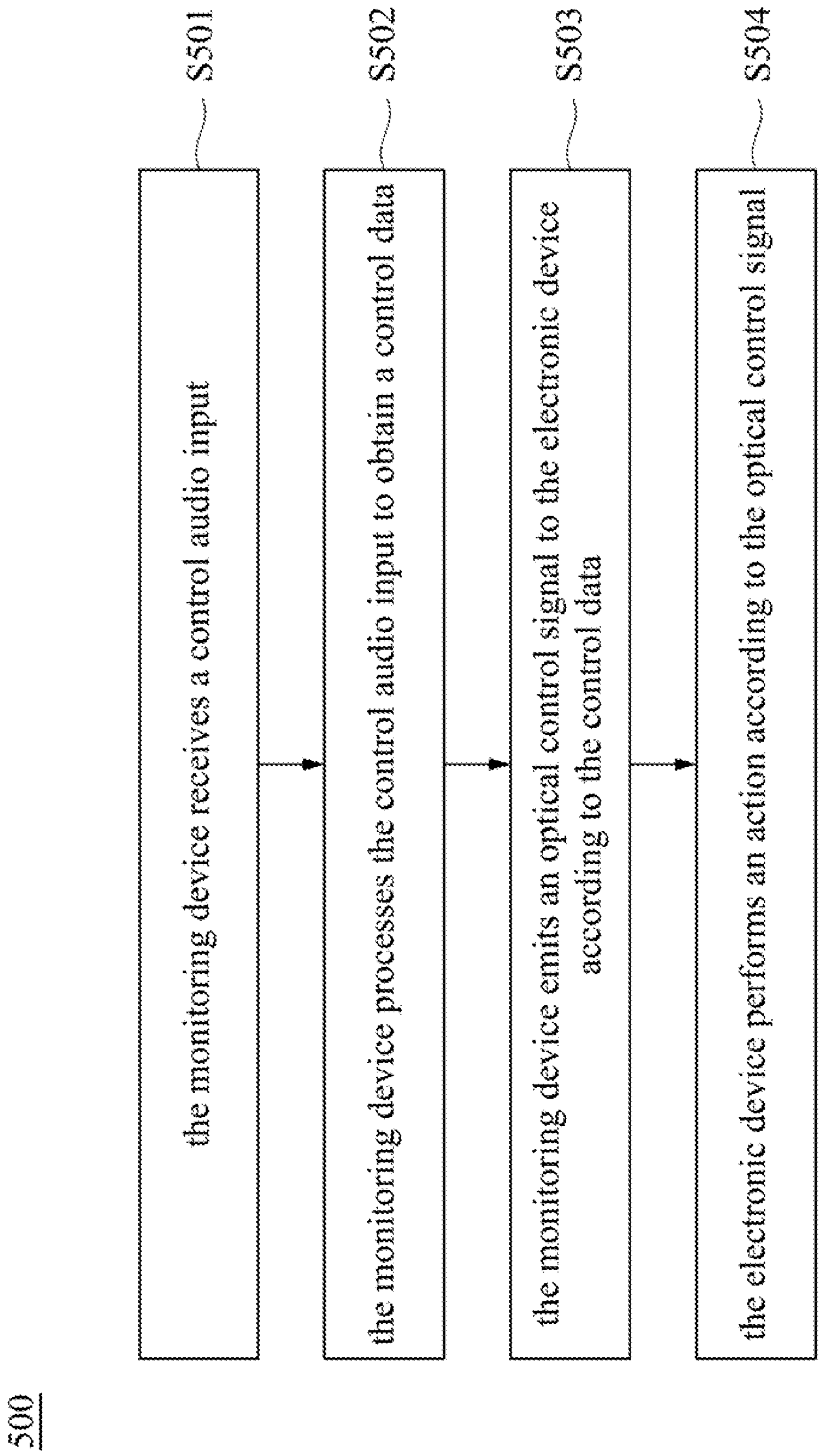
FIG. 5 is a flow diagram of an electronic device control method in accordance with some embodiments of the present disclosure.

Another operation of the electronic device control system 100 would be described in detail below with reference to FIG. 5. Referring to FIG. 5, FIG. 5 is a flow diagram of an electronic device control method 500 in accordance with some embodiments of the present disclosure. However, the person skilled in the art of the present disclosure should understand that the electronic device control method 500 of the embodiments of the present disclosure is not limited to being applied to the electronic device control system 100 of FIG. 1 or FIG. 2, and is not limited to being in the order of steps in the flow diagram of FIG. 5. In some embodiments, the electronic device control method 500 includes steps S501-S504.

In step S501, the monitoring device 20 receives a control audio input Aucn. In some embodiments, as shown in FIG. 2, the monitoring device 20 uses the audio receiving component 230 to receive the control audio input Aucn. In particular, as shown in FIG. 1, the control audio input Aucn can include an audio command spoke by the user 1 to the monitoring device 20, and the audio command is related to specific action capable of being performed by specific electronic device 30. For example, the user 1 may say the command "air conditioner, turn on" to the monitoring device 20.

In step S502, the monitoring device 20 processes the control audio input Aucn to obtain a control data Sc2. In some embodiments, as shown in FIG. 2, the audio receiving component 230 converts the control audio input Aucn into a control audio signal Sucn for outputting the control audio signal Sucn to the control circuit 210. The control circuit 210 then uses the audio processing circuit 213 to perform at least one signal process on the control audio signal Sucn. In particular, the audio processing circuit 213 can perform analog-to-digital (A/D) conversion to convert the control audio signal Sucn from analog form into digital form, and can perform noise reduction and feature extraction on the digital form of control audio signal Sucn to obtain an audio characteristic data (not shown) as the control data Sc2. As can be seen from that, the control circuit 210 is configured to process the control audio signal Sucn to obtain the control data Sc2.

In step S503, the monitoring device 20 emits an optical control signal Oc2 to the electronic device 30 according to the control data Sc2. In some embodiments, as shown in FIG. 2, the control circuit 210 can use the micro control circuit 211 to compare the control data Sc2 with the multiple device action data Sda in the storage circuit 240, and then to find one of the multiple device action data Sda matched to the control data Sc2. The micro control circuit 211 transmits an electric control signal Ec2 having the control code CDc to the light emitting component 260 according to the control code CDc corresponding to the device action data Sda matched to the control data Sc2, in which the electric control signal Ec2 has the voltage level corresponding to the control code CDc according to the timing. Then, the light emitting component 260 emits the optical control signal Oc2 to the corresponding electronic device 30 according the voltage level of the electric control signal Ec2 transmitted based on the control data Sc2. As can be seen from that, the light emitting component 260 can be regarded as emitting the optical control signal Oc2 to the electronic device 30 according to the control code CDc matched to the control data Sc2. It should be understood that the descriptions of step S503 are similar to the descriptions of step S303, and therefore are omitted herein.

In step S504, the electronic device 30 performs the action according to the optical control signal Oc2. In some embodiments, as shown in FIG. 2, the light receiving component 310 in the electronic device 30 receives the optical control signal Oc2, and converts the optical control signal Oc2 into the electric control signal Ec2 having the control code CDc, so that the electronic device 30 performs the corresponding action. It should be understood that the descriptions of step S504 are similar to the descriptions of step S304, and therefore are omitted herein.

Figure 6:
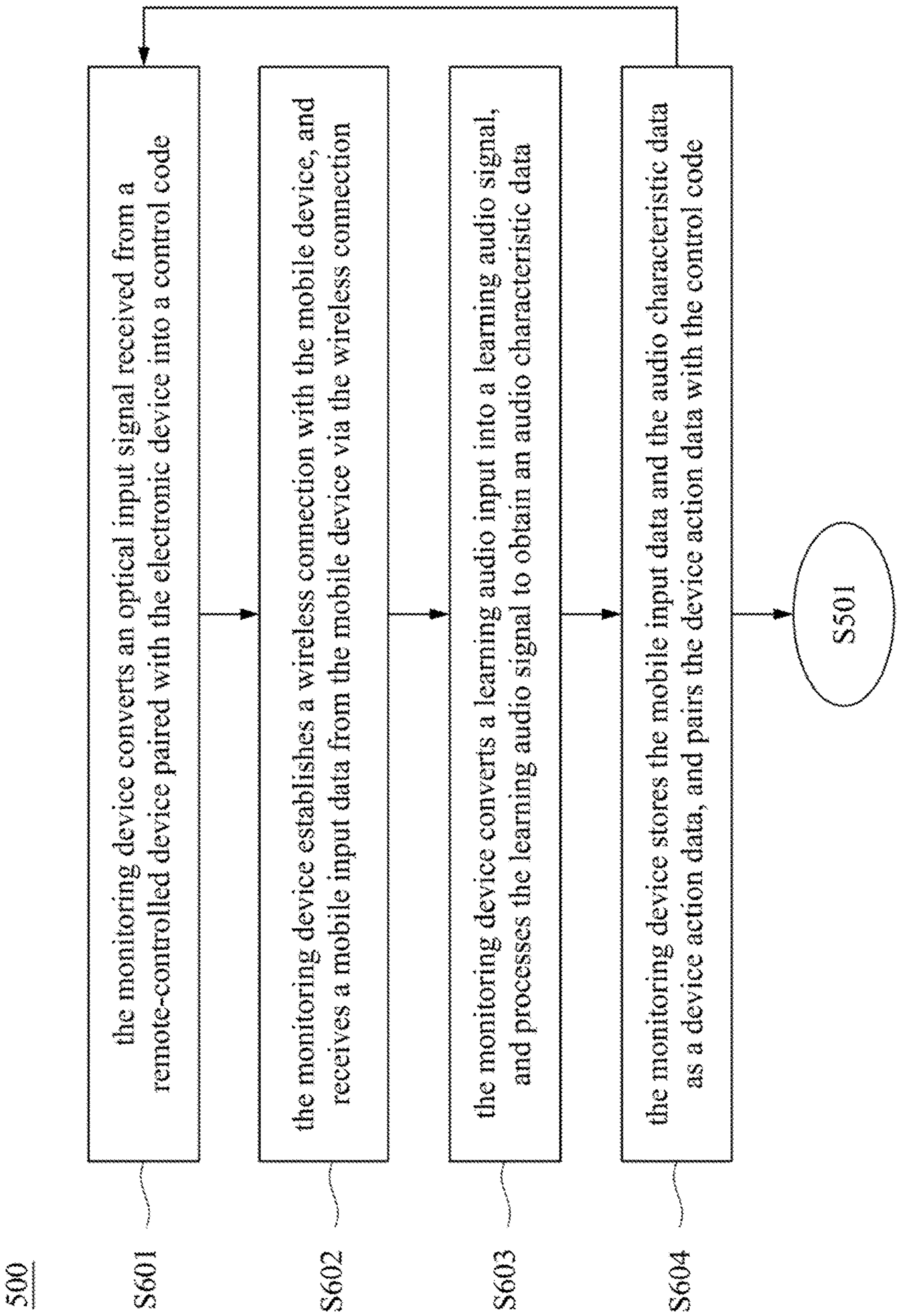
FIG. 6 is a flow diagram of an electronic device control method in accordance with some embodiments of the present disclosure.

The embodiments of FIG. 5 are illustrated based on that the storage circuit 240 has stored the multiple device action data Sda and the multiple control codes CDc, but the electronic device control method 500 of the present disclosure is not limited herein. For example, referring to FIG. 6, FIG. 6 is a flow diagram of the electronic device control method 500 in accordance with some embodiments of the present disclosure. In some embodiments, the storage circuit 240 has not stored the multiple device action data Sda and the multiple control codes CDc yet. Accordingly, the electronic device control method 500 further includes steps S601-S604. As shown in FIG. 6, steps S601-S604 can be performed before step S501. Steps S601-S604 are not limited to being in the order of steps in the flow diagram of FIG. 6.

In step S601, the monitoring device 20 converts the optical input signal Oin received from the remote-controlled device 35 paired with the electronic device 30 into the control code CDc. It should be understood that the descriptions of step S601 are similar to the descriptions of step S401, and therefore are omitted herein.

In step S602, the monitoring device 20 establishes the wireless connection WCN with the mobile device 10, and receives the mobile input data Sin from the mobile device 10 via the wireless connection WCN. It should be understood that the descriptions of step S602 are similar to the descriptions of step S301 and step S402, and therefore are omitted herein.

In step S603, the monitoring device 20 converts a learning audio input Auln into a learning audio signal Suln, and processes the learning audio signal Suln to obtain an audio characteristic data Sac. Similar to the descriptions of the control audio input Aucn, as shown in FIG. 1, the learning audio input Auln can include an audio command that the user 1 speaks to the monitoring device 20 and wants the monitoring device 20 to record, and the audio command is related to specific action that specific electronic device 30 can perform. For example, the user 1 may say the command "air conditioner, turn off" to the monitoring device 20. In some embodiments, as shown in FIG. 2, the audio receiving component 230 converts the learning audio input Auln into the learning audio signal Suln for outputting the learning audio signal Suln to the control circuit 210. The control circuit 210 then uses the audio processing circuit 213 to perform at least one signal process (e.g., A/D conversion, noise reduction, feature extraction, etc.) on the learning audio signal Suln to obtain the audio characteristic data Sac.

In step S604, the monitoring device 20 stores the mobile input data Sin and the audio characteristic data Sac as the device action data Sda, and pairs the device action data Sda with the control code CDc. In some embodiments, the control circuit 210 uses the audio characteristic data Sac and the mobile input data Sin received from the communication circuit 220 as the device action data Sda, and stores the device action data Sda and the control code CDc obtained by converting the electric input signal Ein received from the light receiving component 270 in the storage circuit 240 for pairing.

By repeatedly performing steps S601-S604, the monitoring device 20 can learn or memorize the multiple control codes CDc used for controlling a variety of electronic devices 30 to perform multiple different actions. In addition, as can be seen from the description of FIG. 5, by comparing the control data Sc2 with the multiple device action data Sda, the monitoring device 20 can find the control code CDc corresponding to the control data Sc2 rapidly, so as to control specific electronic device 30 to perform specific action corresponding to the audio command of the user 1.

As can be seen from the above embodiments of the present disclosure, the monitoring device 20, the electronic device control system 100 and the electronic device control method 300/500 of the present disclosure utilize common or easily available optical communication technologies to control the electronic devices 30 which are set to be remote-controlled through the optical communication technologies after manufacture. That is to say, by using the structure of the present disclosure, the user can realize smart house without purchasing additional smart household appliances or equipment. Therefore, the monitoring device, the electronic device control system and method of the present disclosure have the advantages of low cost and flexible selection of brand.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the invention. In view of the foregoing, it is intended that the present invention cover modifications and variations of this invention provided they fall within the scope of the following claims.

What is claimed is:

1. A monitoring device, comprising:
a lens component configured to capture an image;
a light emitting component;
a communication circuit configured to establish a wireless connection with a mobile device, and configured to receive a first control data from the mobile device via the wireless connection;
a control circuit electrically coupled to the lens component, the light emitting component and the communication circuit, and configured to control the light emitting component to emit a first optical control signal to at least one electronic device according to the first control data, so that the at least one electronic device performs a first action according to the first optical control signal; and
an audio receiving component electrically coupled to the control circuit, and configured to convert a control audio input into a control audio signal, wherein the control audio input is received from a user of the mobile device and comprises an audio command related to a second action capable of being performed by the at least one electronic device, wherein the control circuit is configured to process the control audio signal directly received from the audio receiving component using feature extraction to obtain an audio characteristic data as a second control data, and is configured to directly transmit an electric control signal, which has a control code corresponding to device action data matched to the second control data, to the light emitting component to control the light emitting component to emit a second optical control signal according to the control code, so that the at least one electronic device performs the second action according to the second optical control signal.

2. The monitoring device of claim 1, further comprising:

a storage circuit electrically coupled to the control circuit, and configured to store a plurality of device action data and a plurality of control codes corresponding to the plurality of device action data, wherein the control circuit is further configured to compare the first control data with the plurality of device action data to find one of the plurality of device action data matched to the first control data, and is configured to transmit an electric control signal having one of the plurality of control codes corresponding to the one of the plurality of device action data to the light emitting component, so that the light emitting component emits the first optical control signal according to the one of the plurality of control codes.

3. The monitoring device of claim 1, further comprising:

a light receiving component electrically coupled to the control circuit, and configured to convert an optical input signal received from a remote-controlled device paired with the at least one electronic device into an electric input signal, wherein the control circuit is configured to convert the electric input signal into a control code, and the control code is configured to control the at least one electronic device, wherein the communication circuit is further configured to receive a mobile input data from the mobile device via the wireless connection, wherein the control circuit is further configured to store the mobile input data as a device action data, and is configured to pair the device action data with the control code.

4. The monitoring device of claim 1, further comprising:

a storage circuit electrically coupled to the control circuit, and configured to store a plurality of device action data and a plurality of control codes corresponding to the plurality of device action data, wherein the control circuit is further configured to compare the second control data with the plurality of device action data to find one of the plurality of device action data matched to the second control data, and is configured to transmit an electric control signal having one of the plurality of control codes corresponding to the one of the plurality of device action data to the light emitting component, so that the light emitting component emits the second optical control signal according to the one of the plurality of control codes.

5. The monitoring device of claim 1, further comprising:

a light receiving component electrically coupled to the control circuit, and configured to convert an optical input signal received from a remote-controlled device paired with the at least one electronic device into an electric input signal, wherein the control circuit is configured to convert the electric input signal into a control code, and the control code is configured to control the at least one electronic device, wherein the communication circuit is further configured to receive a mobile input data from the mobile device via the wireless connection, wherein the audio receiving component is further configured to convert a learning audio input into a learning audio signal, wherein the control circuit is further configured to process the learning audio signal to obtain an audio characteristic data, is configured to store the mobile input data and the audio characteristic data as a device action data, and is configured to pair the device action data with the control code.

6. An electronic device control system, comprising:

a monitoring device, comprising:

a lens component configured to capture an image;

a light emitting component;

a communication circuit configured to establish a wireless connection with a mobile device, and configured to receive a first control data from the mobile device via the wireless connection;

a control circuit electrically coupled to the lens component, the light emitting component and the communication circuit, and configured to control the light emitting component to emit a first optical control signal according to the first control data; and an audio receiving component electrically coupled to the control circuit, and configured to convert a control audio input into a control audio signal, wherein the control audio input is received from a user of the mobile device; and at least one electronic device configured to perform a first action according to the first optical control signal;

wherein the control audio input comprises an audio command related to a second action capable of being performed by the at least one electronic device, and the control circuit is configured to process the control audio signal directly received from the audio receiving component using feature extraction to obtain an audio characteristic data as a second control data, and is configured to directly transmit an electric control signal, which has a control code corresponding to device action data matched to the second control data, to the light emitting component to control the light emitting component to emit a second optical control signal according to the control code, so that the at least one electronic device performs the second action according to the second optical control signal.

7. The electronic device control system of claim 6, wherein the monitoring device further comprises:

a storage circuit electrically coupled to the control circuit, and configured to store a plurality of device action data and a plurality of control codes corresponding to the plurality of device action data, wherein the control circuit is further configured to compare the first control data with the plurality of device action data to find one of the plurality of device action data matched to the first control data, and is configured to transmit an electric control signal having one of the plurality of control codes corresponding to the one of the plurality of device action data to the light emitting component, so that the light emitting component emits the first optical control signal according to the one of the plurality of control codes.

8. The electronic device control system of claim 6, wherein the monitoring device further comprises:

a light receiving component electrically coupled to the control circuit, and configured to convert an optical input signal received from a remote-controlled device paired with the at least one electronic device into an electric input signal, wherein the control circuit is configured to convert the electric input signal into a control code, and the control code is configured to control the at least one electronic device, wherein the communication circuit is further configured to receive a mobile input data from the mobile device via the wireless connection, wherein the control circuit is further configured to store the mobile input data as a device action data, and is configured to pair the device action data with the control code.

9. The electronic device control system of claim 6, wherein the monitoring device further comprises:

a storage circuit electrically coupled to the control circuit, and configured to store a plurality of device action data and a plurality of control codes corresponding to the plurality of device action data, wherein the control circuit is further configured to compare the second control data with the plurality of device action data to find one of the plurality of device action data matched to the second control data, and is configured to transmit an electric control signal having one of the plurality of control codes corresponding to the one of the plurality of device action data to the light emitting component, so that the light emitting component emits the second optical control signal according to the one of the plurality of control codes.

10. The electronic device control system of claim 6, wherein the monitoring device further comprises:

a light receiving component electrically coupled to the control circuit, and configured to convert an optical input signal received from a remote-controlled device paired with the at least one electronic device into an electric input signal, wherein the control circuit is configured to convert the electric input signal into a control code, and the control code is configured to control the at least one electronic device, wherein the communication circuit is further configured to receive a mobile input data from the mobile device via the wireless connection, wherein the audio receiving component is further configured to convert a learning audio input into a learning audio signal, wherein the control circuit is further configured to process the learning audio signal to obtain an audio characteristic data, is configured to store the mobile input data and the audio characteristic data as a device action data, and is configured to pair the device action data with the control code.

11. The electronic device control system of claim 6, wherein the control circuit comprises:

a micro control circuit coupled to the communication circuit and the light emitting component, and configured to receive the first control data from the communication circuit;

an audio processing circuit coupled between the audio receiving component and the micro control circuit, and configured to extract an audio characteristic data from the control audio signal as the second control data for outputting the second control data to the micro control circuit; and an image processing circuit coupled between the lens component and the micro control circuit, and configured to process the image.

12. The electronic device control system of claim 6, wherein the at least one electronic device comprises:

a light receiving component configured to receive the first optical control signal, and configured to convert the first optical control signal into an electric control signal, so that the at least one electronic device performs the first action according to a control code obtained by converting the electric control signal.

13. An electronic device control method, comprising:

establishing a wireless connection between a monitoring device and a mobile device;

by the monitoring device, receiving a first control data from the mobile device via the wireless connection;

by the monitoring device, emitting a first optical control signal to an electronic device according to the first control data;

by the electronic device, performing a first action according to the first optical control signal;

by an audio receiving component of the monitoring device, receiving a control audio input from a user of the mobile device, wherein the control audio input comprises an audio command related to a second action capable of being performed by the electronic device;

by the audio receiving component of the monitoring device, converting the control audio input into a control audio signal and by a control circuit of the monitoring device, processing the control audio signal directly received from the audio receiving component using feature extraction to obtain an audio characteristic data as a second control data and directly transmitting an electric control signal, which has a control code corresponding to device action data matched to the second control data, to a light emitting component of the monitoring device;

by the light emitting component of the monitoring device, emitting a second optical control signal to the electronic device according to the control code; and by the electronic device, performing the second action according to the second optical control signal.

14. The electronic device control method of claim 13, wherein emitting the optical control signal to the electronic device according to the control data comprises:

comparing the control data with a plurality of device action data to find one of the plurality of device action data matched to the control data; and emitting the optical control signal according to one of a plurality of control codes corresponding to the one of the plurality of device action data.

15. The electronic device control method of claim 13, further comprising:

by the monitoring device, converting an optical input signal received from a remote-controlled device paired with the electronic device into a control code, wherein the control code is configured to control the electronic device;

by the monitoring device, receiving a mobile input data from the mobile device via the wireless connection; and by the monitoring device, storing the mobile input data as a device action data, and pairing the device action data with the control code.

16. An electronic device control method, comprising:

by an audio receiving component of a monitoring device, receiving a control audio input from a user of a mobile device, wherein the control audio input comprises an audio command related to an action capable of being performed by an electronic device;

by the audio receiving component of the monitoring device, converting the control audio input into a control audio signal and by a control circuit of the monitoring device, processing the control audio signal directly received from the audio receiving component using feature extraction to obtain an audio characteristic data as a control data and directly transmitting an electric control signal, which has a control code corresponding to device action data matched to the control data, to a light emitting component of the monitoring device;

by the light emitting component of the monitoring device, emitting an optical control signal to the electronic device according to the control code; and by the electronic device, performing the action according to the optical control signal.

17. The electronic device control method of claim 16, wherein emitting the optical control signal to the electronic device according to the control data comprises:

comparing the control data with a plurality of device action data to find one of the plurality of device action data matched to the control data; and emitting the optical control signal according to one of a plurality of control codes corresponding to the one of the plurality of device action data.

18. The electronic device control method of claim 16, further comprising:

by the monitoring device, converting an optical input signal received from a remote-controlled device paired with the electronic device into a control code, wherein the control code is configured to control the electronic device;

by the monitoring device, establishing a wireless connection with a mobile device, and receiving a mobile input data from the mobile device via the wireless connection;

by the monitoring device, converting a learning audio input into a learning audio signal, and processing the learning audio signal to obtain an audio characteristic data; and by the monitoring device, storing the mobile input data and the audio characteristic data as a device action data, and pairing the device action data with the control code.

* * * * *